United States Patent
Park et al.

(10) Patent No.: US 8,113,665 B2
(45) Date of Patent: Feb. 14, 2012

(54) MICRO-SCANNER AND IMAGE PROJECTION APPARATUS USING THE SAME

(75) Inventors: Byeong-Hoon Park, Suwon-si (KR); Mun-Kue Park, Suwon-si (KR)

(73) Assignee: Samsung Electronics Co., Ltd., Yeongtong-Gu, Suwon-Si, Gyeonggi-Do (KR)

(*) Notice: Subject to any disclaimer, the term of this patent is extended or adjusted under 35 U.S.C. 154(b) by 547 days.

(21) Appl. No.: 12/148,245

(22) Filed: Apr. 17, 2008

(65) Prior Publication Data

US 2008/0309887 A1 Dec. 18, 2008

(30) Foreign Application Priority Data

Jun. 15, 2007 (KR) .................. 10-2007-0058989

(51) Int. Cl.
G03B 21/28 (2006.01)
G03B 21/26 (2006.01)

(52) U.S. Cl. .......................................... 353/98; 353/37

(58) Field of Classification Search ............ 353/31, 353/37, 46, 50, 98, 100, 119; 359/196.1, 359/197.1, 198.1, 199.1–199.4, 200.1–200.5, 359/201.1–201.3; 250/234–236; 348/195–205, 348/744–775

See application file for complete search history.

(56) References Cited

U.S. PATENT DOCUMENTS

| | | | | |
|---|---|---|---|---|
| 3,353,022 A | * | 11/1967 | Schwartz | 250/347 |
| 5,283,682 A | * | 2/1994 | Ostaszewski | 359/198.1 |
| 6,644,821 B2 | * | 11/2003 | Ikegame | 359/872 |
| 6,788,398 B1 | * | 9/2004 | Guttman | 356/121 |
| 7,773,277 B2 | * | 8/2010 | Yamaguchi et al. | 359/200.7 |
| 7,773,281 B2 | * | 8/2010 | Maeno et al. | 359/209.1 |
| 2002/0191092 A1 | * | 12/2002 | Hayashi et al. | 348/294 |
| 2007/0012875 A1 | * | 1/2007 | Miyazawa | 250/234 |
| 2007/0258050 A1 | * | 11/2007 | Park et al. | 353/31 |
| 2009/0213445 A1 | * | 8/2009 | Kabeya | 359/198.1 |
| 2009/0244669 A1 | * | 10/2009 | Uchikawa | 359/202.1 |
| 2010/0027088 A1 | * | 2/2010 | Lee et al. | 359/200.1 |

* cited by examiner

Primary Examiner — Que T Le
Assistant Examiner — Pascal M Bui Pho
(74) Attorney, Agent, or Firm — Cha & Reiter, LLC (57) ABSTRACT

A micro-scanner adapted for being miniaturized and an image projection apparatus using the same. The micro-scanner includes a scan mirror for scanning incident light to a screen while swinging about a rotary shaft; and upper and lower supports for rotatably supporting the top and bottom parts of the rotary shaft. The upper and lower supports having a driving unit for supplying driving force for rotating the scan mirror.

18 Claims, 6 Drawing Sheets

MICRO-SCANNER AND IMAGE PROJECTION APPARATUS USING THE SAME

CLAIM OF PRIORITY

This application claims the benefit of priority under 35 U.S.C. §119(a) from an application entitled "Micro-Scanner and Image Projection Apparatus Using the Same," filed in the Korean Intellectual Property Office on Jun. 15, 2007 and assigned Serial No. 2007-58989, the contents of which are hereby incorporated by reference in its entirety.

BACKGROUND OF THE INVENTION

1. Field of the Invention

The present invention relates to a micro-scanner and other display devices that are miniaturized, and an image projection apparatus that facilitates viewing of miniaturized screens.

2. Description of the Related Art

Efforts to reduce the size of mobile equipment, such as portable terminals, are being continuously made due to the demands of the marketplace and advances in technology. Consequently, in an effort to miniaturize mobile equipment, one way to reduce the size and weight of such mobile equipment is by reducing the screen size.

For example, the size of screens of many portable terminals is typically in the range of about 2 to 3 inches. Due to the narrow screen size, it is inevitable that the applicability of such screens is limited, and the types of contents applicable to those screens are also limited.

Recently, an image projection function (a projector function) has been implemented in mobile equipments according to the convergence of digital techniques, which allows contents, such as moving images, still images, and an electronic book, to be projected to a magnified size of 10 to 40 inches, making it possible for many people to be able to see more clearly the contents provided to their mobile equipment.

In an image projection apparatus, a scanner for projecting images on a screen will scan light beams horizontally as well as vertically, an example of which includes a polygon mirror disclosed in Korean Patent Publication No. 2003-0041156 and a galvanometer disclosed in U.S. Pat. No. 5,671,042 are representative examples of the operation of such a scanner.

However, as the polygon mirror is mechanically driven, there are limitations associated with increasing a scan rate of such an apparatus. Moreover, the polygon mirror is difficult to miniaturize, which renders the use of a polygon mirror as very disadvantageous in implementing miniaturized mobile equipment. Accordingly, there is a need in the art for a micro-scanner and image projection apparatus having improved functionality and reduced size, particularly for use with mobile equipment, which is heretofore unknown.

SUMMARY OF THE INVENTION

Accordingly, the present invention has been made in part to solve at least some of the above-mentioned problems occurring in the prior art, and the present invention provides a micro scanner capable of being miniaturized that includes at least some of the advantages described herein below.

In addition, the present invention provides an image projection apparatus which can be incorporated in mobile equipment, and has low power consumption characteristics by applying such a miniaturized micro scanner.

According to an exemplary aspect of the present invention, there is provided a micro-scanner including: a scan mirror for scanning incident light to a screen while swinging about a rotary shaft; and upper and lower supports for rotatably supporting the top and bottom parts of the rotary shaft, the upper and lower supports having a driving unit for supplying driving force for rotating the scan mirror.

Elements forming the driving unit may be arranged, for example, in the upper and lower supports in a distributed fashion.

The micro-scanner according to the present invention may further include, for example, an iris interposed between the upper and lower supports so as to limit the spot size of light incident into the scan mirror.

According to another exemplary aspect of the present invention, there is provided an image projection apparatus including a light source for emitting light for use in projecting an image, an optical modulator for modulating the light incident from the light source according to an image signal, and a scanner for scanning the light incident from the light modulator on a screen. The scanner may include a scan mirror for scanning incident light to a screen while swinging about a rotary shaft; upper and lower supports for rotatably supporting the top and bottom parts of the rotary shaft, the upper and lower supports having a driving unit for supplying driving force for rotating the scan mirror; and an iris interposed between the upper and lower supports so as to limit the spot size of light incident into the scan mirror from the optical modulator.

BRIEF DESCRIPTION OF THE DRAWINGS

The above and other exemplary objects, features and advantages of the present invention will become more apparent from the following detailed description taken in conjunction with the accompanying drawings, in which.

DETAILED DESCRIPTION

Hereinafter, exemplary embodiments of the present invention will be described with reference to the accompanying drawings. It should be noted that in the following description, the same elements will be designated by the same reference numerals even though they are shown in different drawings. In addition, in the following description of the present invention, a detailed description of known functions and configurations incorporated herein will be omitted when it may make the subject matter of the present invention rather unclear. In addition, although the exemplary embodiments may depict some elements in an upper support and other elements in a lower support, a person of ordinary skill in the art appreciates that it is within the spirit and scope of the invention to arrange components differently than depicted, e.g. elements arranged in the upper support can be arranged in the lower support, and vice versa.

Figure 1:
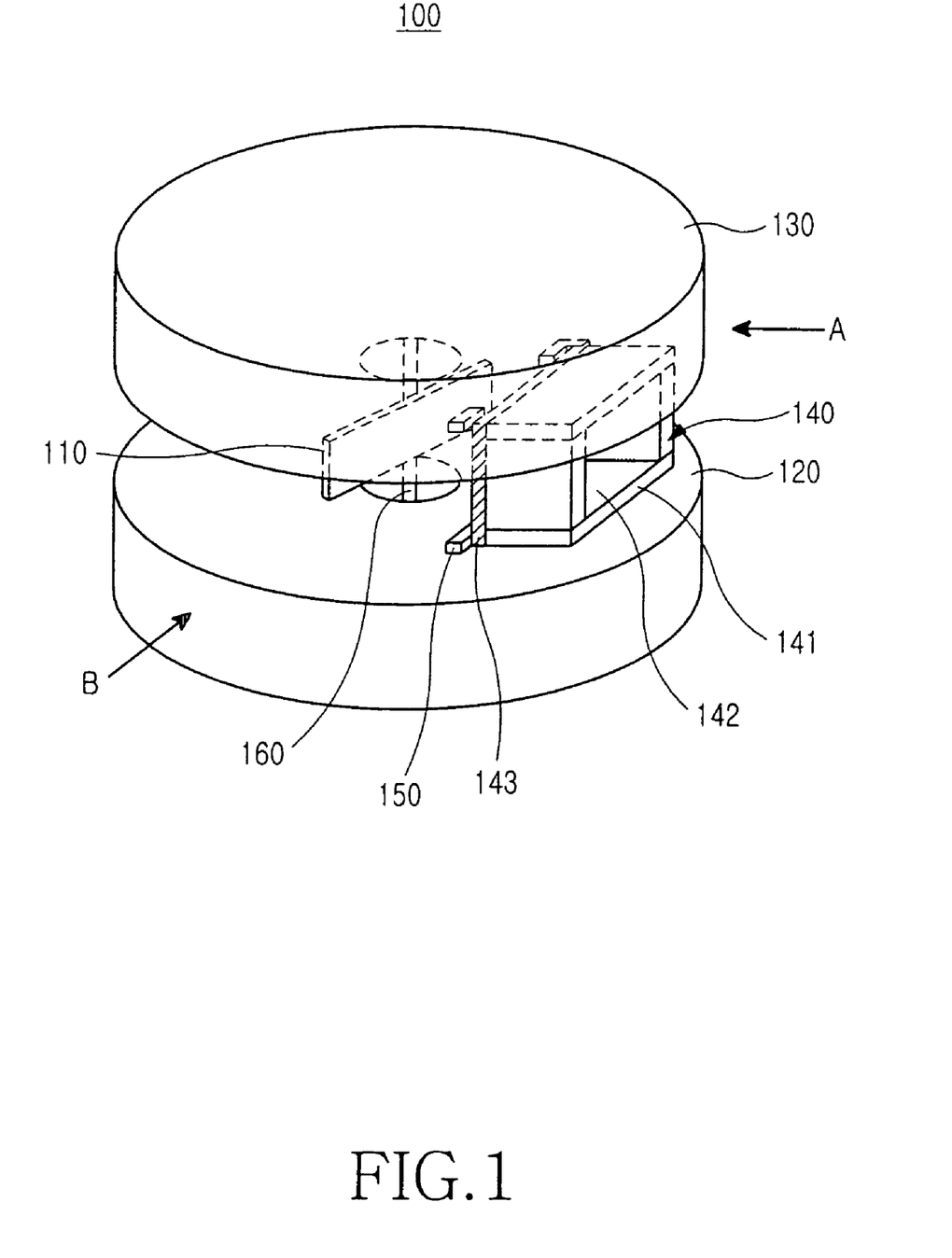
FIGS. 1 to 3 show a construction of a scanner according to an exemplary embodiment of the present invention.
Figure 2:
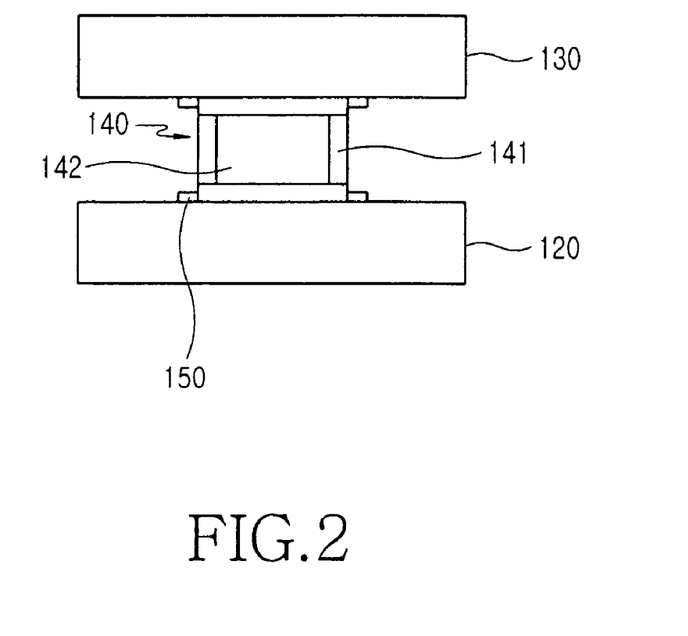
Figure 3:
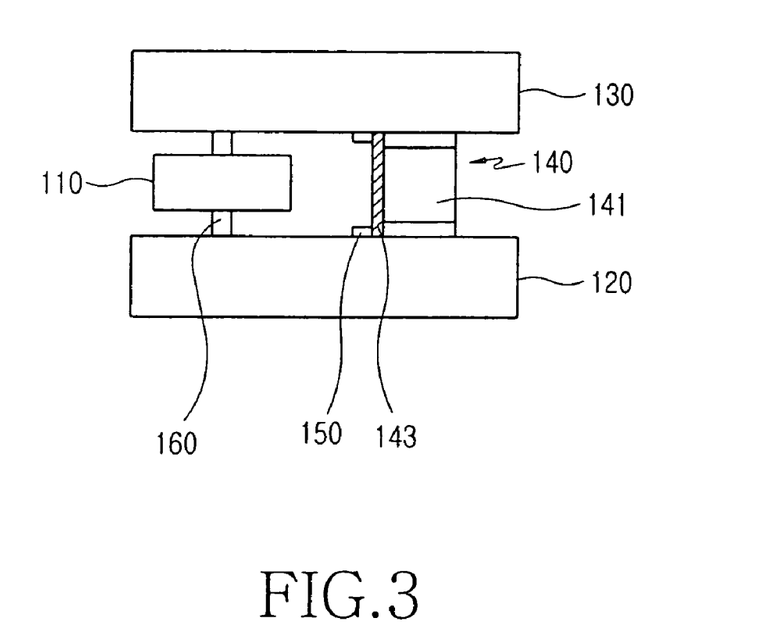

FIG. 1 is a perspective view showing a construction of a micro-scanner according to an exemplary embodiment of the present invention, FIG. 2 is a front view of the micro-scanner of FIG. 1 taken in the direction indicated by arrow A, and FIG. 3 is another front view of the micro-scanner of FIG. 1 taken in the direction indicated by arrow B.

Referring to FIGS. 1 to 3, the micro-scanner 100 according to the present exemplary embodiment includes a scan mirror 110, upper and lower supports 130 and 120, an iris 140, and an iris alignment protrusion 150. The micro-scanner 100 functions to project the light incident from an optical modulator onto a screen in a line scan mode.

The scan mirror 110 is installed between the upper and lower supports 130 and 120 to permit rotating about a rotary shaft 160, so that the scan mirror 110 periodically rotates clockwise or counterclockwise about the rotary shaft 160. The scan mirror 110 is a micro-mirror typically formed by coating silver, aluminum and a plurality of insulation films on a surface of a thin glass or silicon wafer, and has a highly reflective characteristic.

Still referring to FIG. 1, an image projected on a screen at a time point is displayed in a form of line corresponding to one pixel column, and the line image is moved left or right in direction of a row of pixels as the scan mirror 110 rotates, thereby creating an image frame.

For example, if the scan mirror 110 rotates clockwise, a red sub-frame is created, and if the scan mirror 110 rotates counterclockwise, a green sub-frame is created. If the scan mirror 110 rotates clockwise again, a blue sub-frame is created. One color frame is created by combining the red, green and blue sub-frames. An angular rotation range in the clockwise or counterclockwise direction can be optionally set that takes into consideration a size of a projected image, power consumption or the like. In order to reduce the power consumption, it is preferable to set the amount of angular rotation to within about a ±10 degree range.

The lower and upper supports, 120 and 130, may serve as a driving unit for rotating the scan mirror 110, and/or as a detection unit for determining the position of the scan mirror 110 by periodically rotating the rotary shaft 160 clockwise or counterclockwise while supporting the top and bottom ends of the rotary shaft 160. In general, a light beam proceeding within an image projection apparatus has an optical axis located at a central position of the height of the apparatus, and the scan mirror 110 preferably positioned on the optical axis.

For example, the scanner construction may only comprise the lower driving unit and the scan mirror of the above-mentioned construction, as it may be advantageous in view of the size reduction. However, it is not preferable for such a scanner construction because the amount of torque may not be sufficient within a thickness of slim mobile equipment, and also because the upper space for the detection unit may not otherwise be occupied.

Therefore, according to this exemplary embodiment of the present invention, by dividing the above-mentioned construction into the upper and lower structures and arranging the driving unit and the detection unit in the upper and lower structures in a distributed fashion, it is possible to secure the torque characteristic as well as the miniaturization characteristic.

Figure 4:
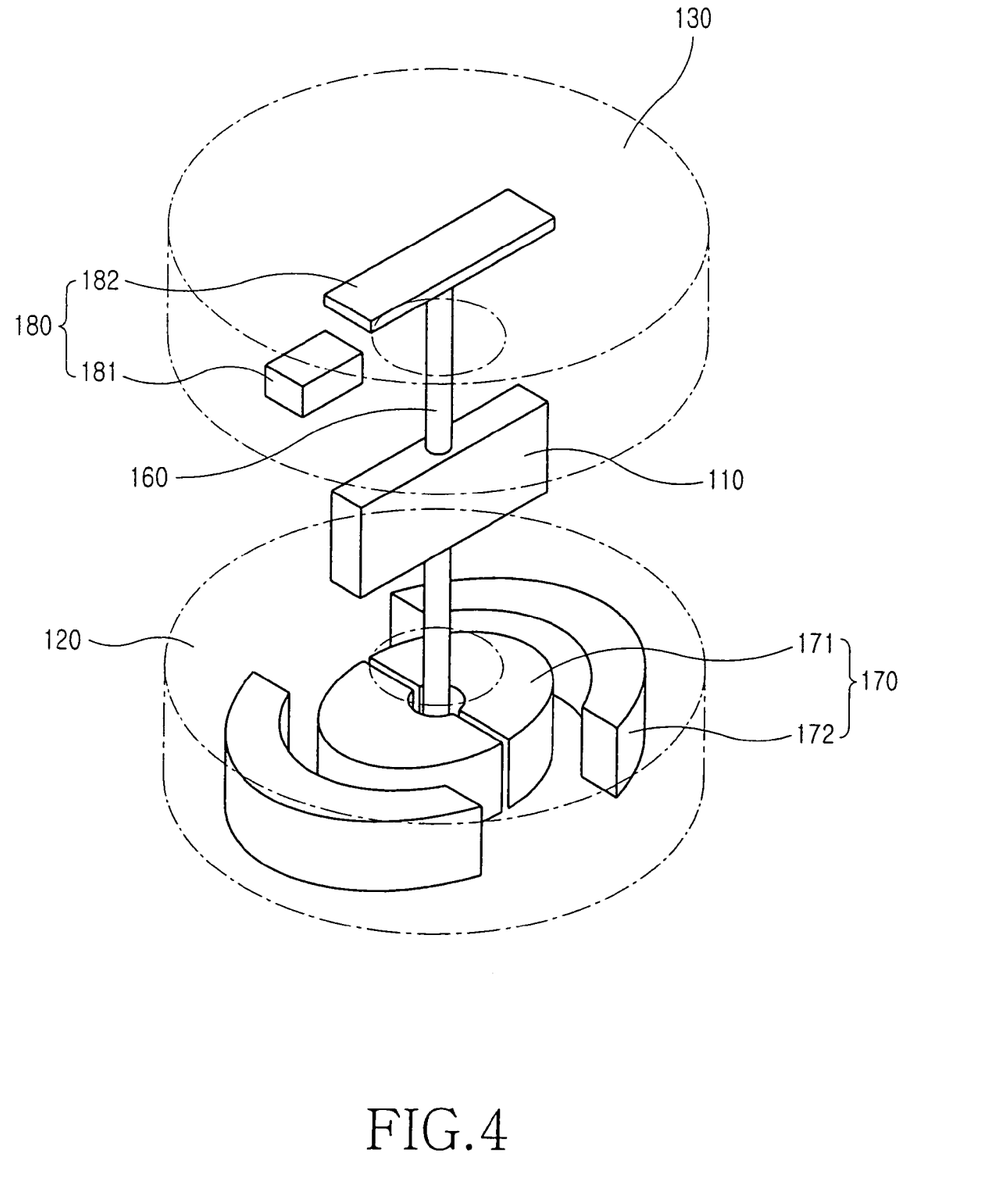
FIG. 4 shows an internal construction of upper and lower supports according to an exemplary embodiment of the present invention.

With reference to FIG. 4, a driving unit 170, comprising a coil 171 and a magnet 172 for driving the scan mirror 110 is arranged in the lower support 120, and a detection unit 180 comprising a Hall sensor 181 and an inspection magnet 182 is arranged in the upper support 130.

Conversely, the detection unit 180 may be arranged in the lower support 120, and the driving unit 170 may be arranged in the upper support 130. According to the present invention, by divisionally configuring the upper and lower supports 130 and 120 for supporting the rotary shaft 160 in this manner, the rotary shaft 160 is prevented from shaking at the time of rotation, and to provide an even driving force throughout the rotary shaft, despite the reduced (miniaturized) size of the scanner. In addition, it is also possible to distribute the components of the driving unit for rotating the scan mirror and the detection unit over the upper and lower supports 130 and 120.

According to this exemplary embodiment of the present invention, the scanner 100 adopts a swing rotation method to swing within a preset angular rotation range, rather than a uni-directional rotation method using a conventional motor. Accordingly, it is preferred to employ a servo driving method, although it is also possible to employ an open loop method.

In addition, by providing an LED (light emitting diode) for emitting light, a filter structure for controlling the amount of light depending on the angle, and an optical detector for detecting the light as electric signals within the upper support 130 and/or the lower support 120, the differences in detected signals depending on the angle can be determined. Based on the differences in detected signals, the scan mirror can be controlled so as to periodically swing within a precise angular range on the basis of the detected signals.

One example of a detection apparatus for determining an angular position of a scan mirror is disclosed in U.S. Pat. No. 5,844,673 (entitled "Axial LED Detector for Determining the Angular Position of a Rotatable Element") discloses an optical detection apparatus in which the amount of light emitted from an LED light source is controlled depending on the rotating angle of the scan mirror and incident into an optical detector (photodiode) including four divided faces, whereby the rotating angle, i.e. the position of the scan mirror, can be determined on the basis of the value of the detected optical current.

Now again referring to FIGS. 1 to 3, the iris 140 is located at a side of the scan mirror 110 so that the iris 140 is positioned on the optical path of the scan mirror, and affixed by the upper and lower supports 130 and 120. The iris 140 functions to limit the spot size of light incident into the scan mirror 110.

Figure 5:
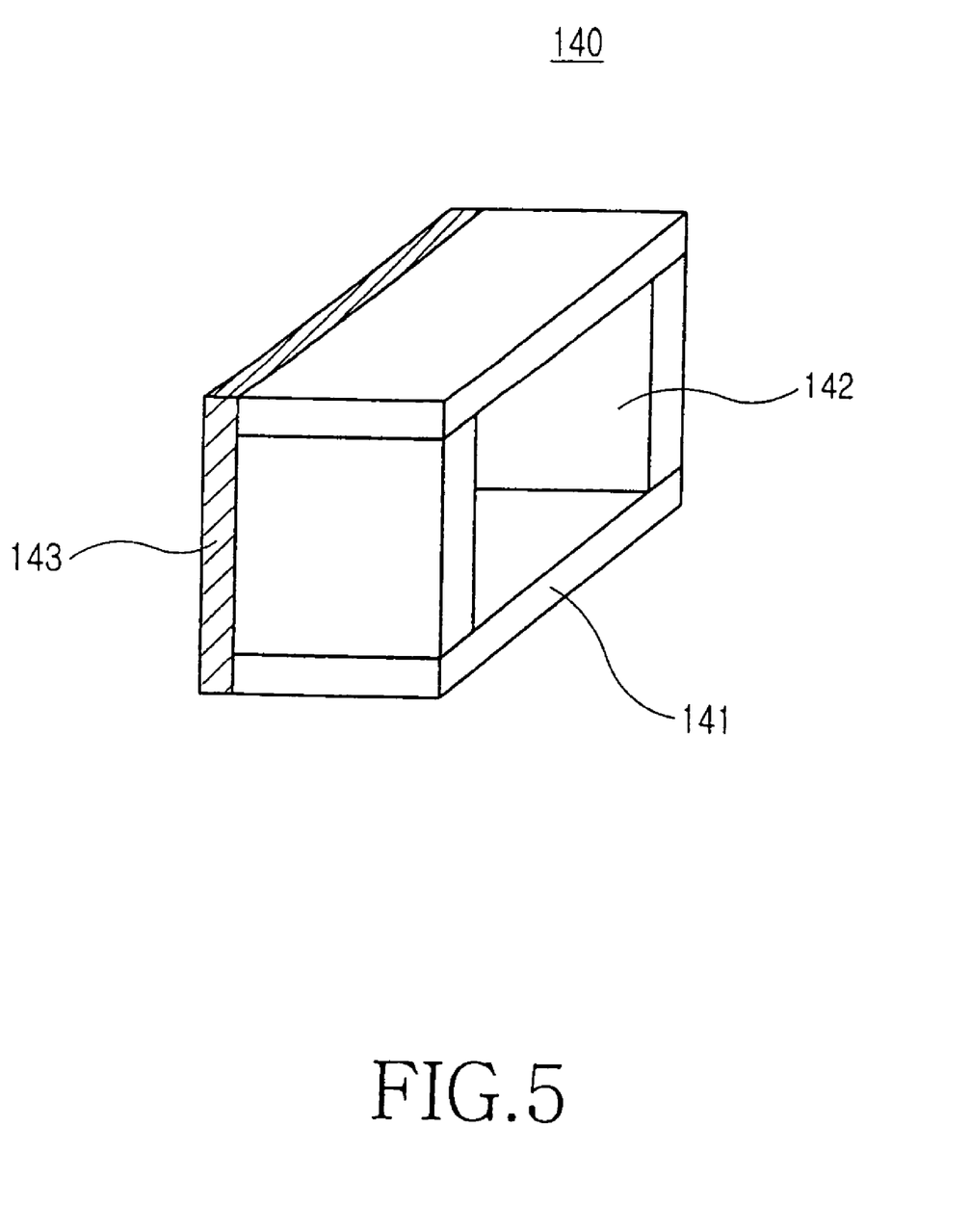
FIG. 5 shows a construction of an iris according to an exemplary embodiment of the present invention.

FIG. 5 shows the construction of an iris according to an exemplary embodiment of the present invention, wherein the iris 140 includes a hollow rectangular parallelepiped (or a matchbox shaped) body 141, and a slit 142 formed through the body.

Because the iris 140 should allow a $0^{th}$-order beam to pass and remove a $1^{st}$-or higher-order beam, the height of the slit is important. For the reason that a separation distance between a $0^{th}$-order beam and a $1^{st}$-order beam is determined by an optical design, the height of the slit is determined in a size exceeding a $0^{th}$-order beam but preventing the transmission of a $1^{st}$-or higher-order beam. Thus, the $1^{st}$-or higher-order beam is blocked without transmitting the iris 140, and may run against the walls of the iris several times. Therefore, it is desirable to reduce the reflection of the beam through black-colored coating or non-reflective coating of the walls (in particular, light incident wall) of the iris so as to prevent irregularly scattered beams from returning to the scan mirror.

With regard to construction, the iris 140 may be formed by cutting and folding or joining a thin metallic sheet or pressing such a metallic sheet. In addition, the iris 140 may be arranged into the space between the upper and lower supports 130 and 120. When positioning the iris 140 between the upper and lower supports 130, 120, the iris 140 can be more easily positioned if by being somewhat outwardly flared at some of the edges of its four lateral walls, so that each of the edges exhibits elasticity.

The iris alignment protrusion(s) 150 is formed in a "L" shape on one or both of the upper and lower supports 130 and 120, such that the iris alignment protrusion(s) 150 renders the iris to be aligned at a proper position in the x and y direction when the iris is inserted between the upper and lower supports 130,120. The height and width of such an iris alignment protrusion is preferably is sized sufficiently small so that a beam proceeding in the optical path is not interfered with by the protrusion.

Figure 6:
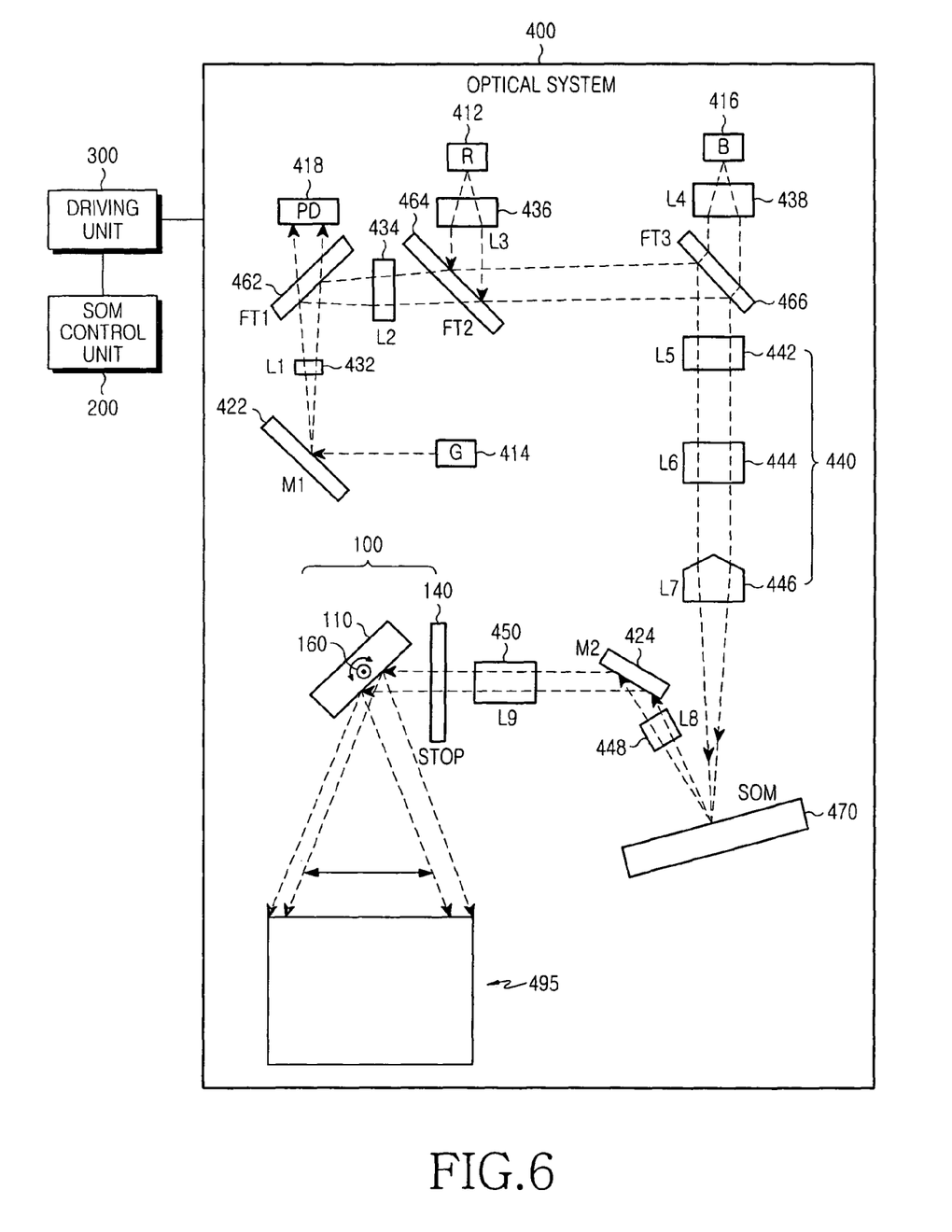
FIG. 6 shows a construction of an image projection apparatus, to which a scanner according to an exemplary embodiment of the present invention is applied.

FIG. 6 shows an example of an image projection apparatus, to which the scanner according to the present invention may be applied. A person of ordinary skill in the art understands and appreciates that the canner according to the present invention is not limited for use with the exemplary image projection apparatus shown and described herein below.

Referring to FIG. 6, the image projection apparatus 1 includes an SOM (Spatial Optical Modulator) control unit 200, a driving unit 300, and an optical system 400.

The SOM control unit 200 operationally processes image data inputted from the outside to a format that can be subjected to line scan timing control in an RGB sequential method for a spatial optical modulator, and the control unit 200 outputs the operationally processed image data to the spatial optical modulator 470 (shown within the optical system 400).

For example, assuming that the projected image has a resolution of M*N (M pixel rows and N pixel columns), the SOM control unit 200 repeatedly performs a procedure for sequentially outputting red, green and blue image data for a p-th pixel column from p=1 to p=N. In addition, the SOM control unit 200 supplies a synchronization signal to the driving unit 300 so that the red, green and blue light sources, the scanner, and the spatial optical modulator can be synchronously driven.

The driving unit 300 typically includes a light source driving unit for outputting a driving signal for driving the red, green and blue light sources according to a synchronization signal inputted from the SOM control unit 200, and a scanner driving unit for outputting a driving signal for driving the scanner according to the synchronization signal inputted from the SOM control unit 200. Each light source is driven by a pulse driving signal and is used for forming a sub-frame of an RGB sequential method. For example, the green light source is used for forming a green sub-frame of the RGB sequential method.

The optical system 400 typically includes a plurality of light sources, such as, for example, light sources 412, 414 and 416 for producing red, green and blue lights for forming an image according to a driving signal inputted from the driving unit 300, a spatial optical modulator 470 for line-modulating and outputting the lights inputted according to image data from the SOM control unit 200, and a scanner 100 for projecting light incident from the spatial optical modulator 470 onto a screen in a line scan method.

The optical system 400 typically includes a red light source 412 for producing red light, a green light source 414 for producing green light, a blue light source 416 for producing blue light, first and second mirrors 422 and 424 for changing the path of incident light through reflection, first to ninth lenses L1 to L9 (identified by even numbers 432 through 450, respectively) for focusing, diverging or collimating light through refraction, an optical detector for detecting incident light as an electric signal, a first filter 462 for executing partial reflection and partial reflection of incident light, second and third filters 464 and 466 for executing transmission or reflection according to the wavelength of incident light, a spatial optical modulator 470 for modulating incident light through reflective diffraction, an iris (mechanical stopper) 140 for limiting the spot size of incident light, and a scanner for 100 for forming a $2^{nd}$ order image by line-scanning incident light of a line form through rotary reflection.

Prior to describing each of the above-mentioned components in detail, respective proceeding paths for red light, green light and blue light will be briefly described below. For the reason that the image projection apparatus 1 sequentially projects a red image, a green image and a blue image onto a screen, two or more lights among the red, green and blue lights do not simultaneously proceed along the same path in the optical system 400.

The green light emitted from the green light source 414 is reflected by the first mirror 422, transmitted through the first lens 432, partially reflected by the first filter 462, transmitted through the second lens 434 and second filter 464, reflected by the third filter 466, transmitted through the fifth to seventh lens 442 to 446, reflected by the spatial optical modulator 470, transmitted through the eighth lens 448, reflected by the second mirror 424, transmitted the ninth lens 450, passed through the iris 140, and reflected by the scanner 100.

The red light emitted from the red light source 412 is transmitted through the third lens 436, reflected by the second filter 464, reflected by the third filter 466, transmitted through the fifth to seventh lens 442 to 446, reflected by the spatial optical modulator 470, transmitted through the eight lens 448, reflected by the second mirror 424, transmitted through the eight lens 450, passed through the iris 140, and reflected by the scanner 100.

The blue light emitted from the blue light source 416 is transmitted through the third filter 466, transmitted through the fifth to seventh lens 442 to 446, reflected by the spatial optical modulator 470, transmitted through the eighth lens 448, reflected by the second mirror 424, transmitted through the ninth lens 450, passed through the iris 140, and reflected by the scanner 100.

Next, the above-mentioned respective components will be described in detail.

The green light source 414 is operated by a driving signal inputted from the driving unit 300, and outputs green light with a wavelength of 532 nm±5 nm, as an example. The green light can be obtained through a method of producing a second harmonic wave so that light with a relatively long wavelength is converted into light with a relatively short wavelength.

Referring to FIG. 6 again, the first mirror 422 reflects the green light incident from the green light source 414 toward the first lens 432. The first mirror 422 bends the light path from the green light source 414 to the first lens 432 by 90 degrees, thereby contributing to reduce the volume of the optical system 400. That is, the green light source 414 is preferably arranged at the center of the optical system 400 because its volume is large. In such a case, if the green light source 414 and the first lens 432 are arranged on a straight line, the volume of the optical system 400 will be substantially increased. Therefore, the optical system 400 has a preferred construction in which the green light source 414 is positioned at the center of the optical system 400, and the remaining components are arranged around the green light source 414. Each of the first and second mirrors 422 and 424 and the scan mirror 110 of the scanner 100 may have a construction formed, for example, by depositing a highly-reflective dielectric film or metallic film on a substrate.

The first lens 432 diverges the green light incident from the first mirror 422 (in other words, increases the spot size of the incident light), and outputs the diverged green light to the first filter 462. A diverging lens, such as a concave lens, may be employed as the first lens 432.

The first filter 462 partially reflects and partially transmits the green light incident from the first lens 432. A part of the green light is transmitted through the first filter and is incident into the light detector 418, and the remainder is reflected by the first filter 462 and is incident into the second lens 434. The first filter 462 bends the light path from the first lens 432 to the second lens 434 by 90 degrees, thereby contributing to reducing the volume of the optical system 400. A beam splitter or a half mirror may be employed as the first filter 462.

The optical detector 418 detects the green light incident from the first filter 462 and in response provides an electric signal that is output to the light source driving unit 300, which in turn determines the power of the green light from the detection signal and controls the green light source to output green light with a constant power by using the determined power. A photodiode may be employed as the optical detector 418.

The second lens 434 collimates and outputs the green light incident from the first filter 462 to the second filter 464. A convex lens may be employed as the second lens 434.

The red light source 412 is driven by a driving signal inputted from the light source driving unit, and outputs red light with a wavelength of 640 nm±10 nm, as an example. A laser diode may be employed as the red light source 412.

The third lens 436 collimates and outputs the red light incident from the red light source 412 to the second filter 464. A convex lens may be employed as the third lens 436.

The second filter 464 reflects and outputs the red light incident from the third lens 436 to the third filter 466, or transmits and outputs the green light incident from the second lens 434 to the third filter 466. A wavelength selective filter reflecting light of a red wavelength and transmitting light of a green wavelength may be employed as the second filter 464. For example, such a wavelength selective filter may be formed by depositing a plurality of films on a glass substrate.

Still referring to FIG. 6, the blue light source 416 is driven by a driving signal inputted from the light source driving unit 300, and outputs blue light with a wavelength of 440 nm±10 nm, as an example. A laser diode may be employed as the blue light source 416.

The fourth lens 438 collimates and outputs the blue light incident from the blue light source 416 to the third filter 466. A convex lens may be employed as the fourth lens 438.

The third filter 466 reflects and outputs the red or green light incident from the second filter 464, or transmits and outputs the blue light incident from the fourth lens 438 to the fifth lens 442. The third filter 466 bends the light path from the second filter 464 to the fifth lens 442 by 90 degrees, thereby contributing to reducing the volume of the optical system 400. A wavelength selective filter reflecting red wavelength light and green wavelength light may be employed as the third filter 466. For example, such a wavelength selective filter may be formed by depositing a plurality of films on a glass substrate.

The fifth to seventh lenses 442 to 446 form an illumination lens system 440, which refracts the light (red, green or blue light) incident from the third filter 466 so that the incident light is linearized on the input and output stages of the spatial optical modulator 470.

At first, the light incident into the fifth lens 442 is in the collimated state.

Only for a first direction (a direction perpendicular to the proceeding direction of the light), the fifth lens 442 diverges the light incident from the third filter 466 only, and for a second direction perpendicular to both the first direction and the light proceeding direction, the fifth lens 442 transmits the light as it stands, thereby outputting the light to the sixth lens 444. A plano-convex cylindrical lens may be employed as the fifth lens 442, wherein the fifth lens 442 has a curved convex surface along the first direction.

For the second direction, the seventh lens 446 focuses the light incident from the sixth lens 444, (in other words, for the second direction, the seventh lens 446 converges the light so that foci are formed on the input and output stages of the spatial optical modulator 470), and for the first direction, the seventh lens 446 transmits the light as it stands, thereby outputting the light to the SOM 470. A convex-piano cylindrical lens may be employed as the seventh lens 446, wherein the seventh lens has a curved convex surface along the second direction.

The spatial optical modulator is driven by the image data inputted from the SOM control unit 200, wherein the image data contains information about a pixel column of a projected image 495. The spatial optical modulator 470 line-modulates the linearized light incident from the seventh lens 446 through reflective diffraction to the eighth lens 448. The spatial optical modulator 470 includes diffraction elements, the number of which corresponds to the number of pixel rows of the projected image 495, on the input and output stages thereof. That is, assuming that the resolution of the projected image is M*N (M pixel rows and N pixel columns), the spatial optical modulator 470 has M diffraction elements.

Each of the diffraction elements diffracts and reflects incident light, and the power of the diffracted light is determined by corresponding pixel information. An example of a known spatial optical modulator, Korean Unexamined Patent Publication No. 2006-47478 (entitled "Open Hole Based Diffractive Optical Modulator") discloses an open hole based diffractive optical modulator including a lower reflection part formed on a base member, an upper micro-mirror spaced from the base member, and an open hole formed in the micro-mirror, whereby an element with the upper micro-mirror in a form of a single ribbon creates one pixel.

Unlike the present exemplary embodiment, the reflective diffraction-type spatial optical modulator may be substituted with any of, for example, a reflection type DLP (Digital Light Processing) panel, an LCoS (Liquid Crystal on Silicon) panel, etc. In addition, the reflective diffraction-type spatial optical modulator may be substituted with a transmission type LCD panel, a 1D or 2D MEMS (Micro Electro Mechanical System), a GLV (Grating Light Valve), or GEMS.

The eighth lens 448 focuses and outputs the light incident from the spatial optical modulator 470 to the second mirror 424. A convex lens may be employed as the eighth lens 448.

The second mirror 448 reflects the light incident from the eighth lens 448 toward the ninth lens 450.

The ninth lens 450 is preferably a projection lens, wherein for the first direction, the ninth lens 450 converges (or focuses) the light incident from the second mirror 424, so that a focus is formed on the reflection surface of the scan mirror 110, and for the second direction, the ninth lens 450 focuses the light, so that a focus is formed on the screen, thereby outputting the light to the scanner 100. The light reflected by the scan mirror 110 is diverged for the first direction, and focused for the second direction. A convex lens may be employed as the ninth lens 450.

Only for the second direction, the seventh lens 446 focuses the light incident from the sixth lens 444 (in other words, the seventh lens 446 converges the light for the second direction in such a manner that foci are formed on the input and output stages of the spatial optical modulator 470), and for the first direction, the seventh lens 446 transmits the light as it stands, thereby outputting the light to the spatial optical modulator 470. A convex-piano cylindrical lens may be employed as the seventh lens 446, wherein the seventh lens 446 has a curved convex face along the second direction.

Figure 7:
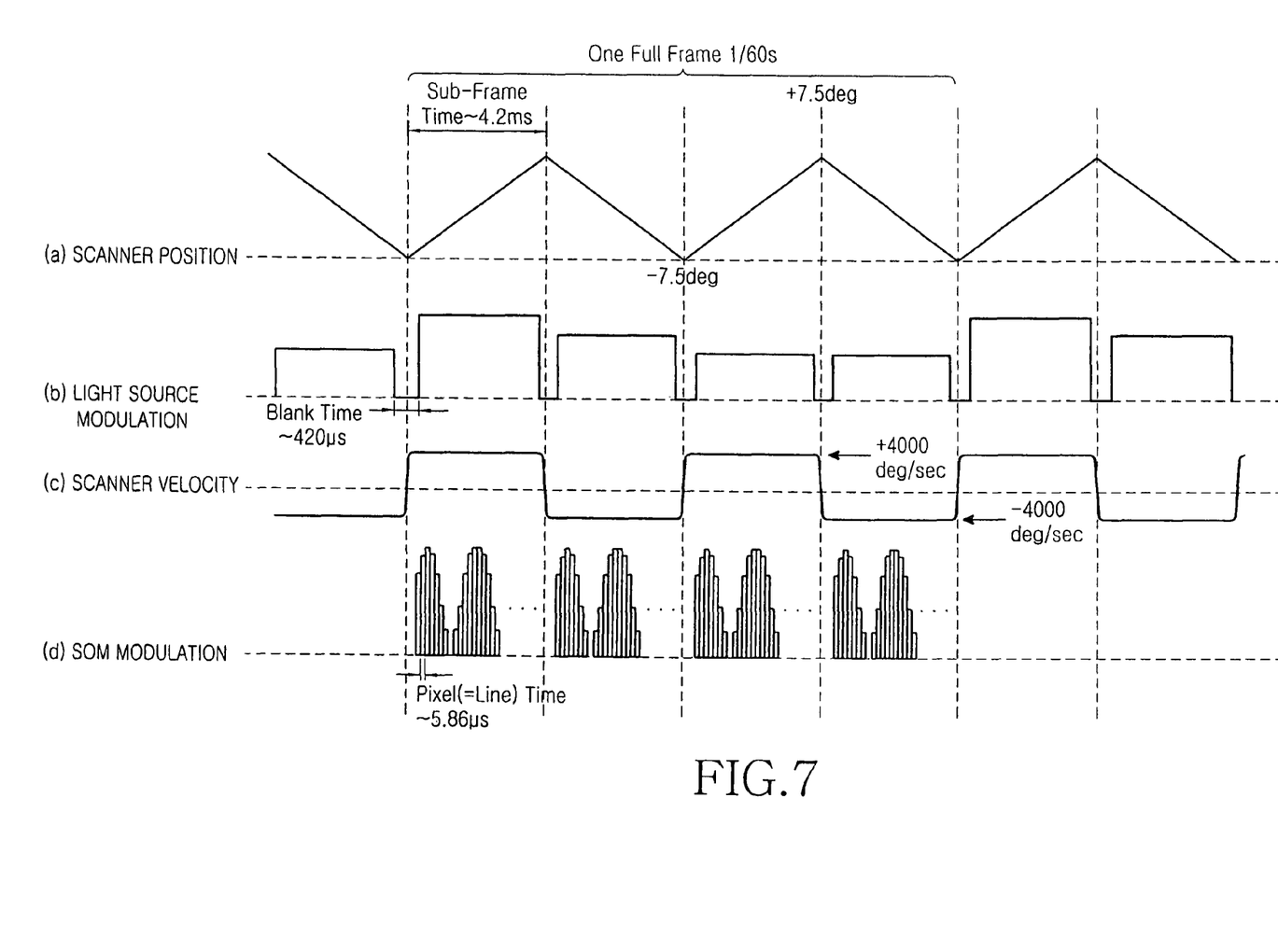
FIGS. 7a to 7d show timing charts for driving an image projection apparatus.

FIGS. 7a to 7d show timing charts for driving the image projection apparatus 1 according to an exemplary embodiment of the present invention. FIG. 7a shows the angular position of the scanner, FIG. 7b shows driving signals for modulating the light sources 412 to 416, FIG. 7c shows the rotational velocity of the scanner 100, and FIG. 7d shows driving signals for the spatial optical modulator 470.

The RGB sequential driving method sequentially creates a red sub-frame, a green sub-frame, and a blue sub-frame, thereby creating a color frame. Alternatively, it is possible to secure flexibility in color representation by allowing the color of the fourth sub-frame (X(R/G/B)) to be selectively set, as shown in FIG. 7b. Because the SPM 470 forms a line image in the pixel column direction, one sub-frame is formed when the scanner projects a line image while moving in the pixel row direction. In the present exemplary embodiment, for example, one color frame is created through two times of swing rotation. A person of ordinary skill in the art should understand and appreciate that the present invention is not limited to two swing rotations to create a color frame, as two is a preferred number.

For example, in order to form a 640*480 VGA sub-frame, the spatial optical modulator should have 480 pixels, wherein when the scanner 100 performs uni-directional rotation (½ swing rotation), 640 line images are projected to the screen. At this time, the pixel time of the spatial optical modulator 470 (i.e., the time period for maintaining a status represented by one pixel) is about 5 µs, and the time required for forming one sub-frame is about 4.2 ms.

As shown in FIG. 7b, a blank time is present between sub-frames, wherein the blank time corresponds to left and right ends of a projected image, and during the blank time area, the moving velocity of the scanner is abruptly changed. If light is not projected during the blank time, it is possible to prevent image distortion.

The inventive image projection apparatus as described above can be incorporated into a mobile apparatus such as a portable terminal. The image projection apparatus may be provided in an accessory form connected to a portable terminal through a cable. Typically the cable would connect via a port or other type of interface. Alternatively, the image projection apparatus could receive information for display from a portable terminal wirelessly.

As described above, the inventive micro-scanner and an image projection apparatus have advantages as follows:

i) A conventional galvanometer with characteristics of high power consumption, large area and wide operating range is not suitable for miniaturized mobile equipment. However, according to the present invention, it is possible to implement a micro-scanner suitable for miniaturized mobile equipment.

ii) By divisionally configuring a support arrangement for supporting a rotary shaft with an upper support and a lower support, it is possible to prevent the rotary shaft from shaking when rotating and to provide uniform driving force throughout the rotary shaft, even if the scanner is miniaturized. Thus, the distribution could be according to weight to reduce vibrations of the rotary shaft. In addition, it is possible to distribute and arrange components forming a detection unit and a driving unit for rotating of a scan mirror in the upper and lower supports. That is, both of the upper and lower spaces in relation to an optical axis can be used.

iii) By arranging an iris in an excessive space and integrating a scanner and the iris, it is possible to reduce the size of an image projection apparatus.

iv) By inserting and affixing the iris between the upper and lower supports of the scanner, it is easy to assemble and align the iris.

While the invention has been shown and described with reference to certain preferred exemplary embodiments thereof, it will be understood by those skilled in the art that various changes in form and details may be made therein without departing from the spirit of the invention and the scope of the appended claims.

What is claimed is:

1. A micro-scanner comprising:
   a rotary shaft having top and bottom parts;
   a scan minor for scanning incident light to a screen while swinging about the rotary shaft;
   upper and lower supports for rotatably supporting the top and bottom parts of the rotary shaft, the upper and lower supports being fixed without movement;
   a driving unit for supplying driving force for rotating the scan minor, said driving unit being arranged in at least one of the upper and lower supports;
   a detection unit for determining a position of the scan mirror; and
   an iris interposed between the upper and lower supports and arranged adjacent the scan mirror on an optical path of the scan mirror for limiting a spot size of light incident into the scan mirror,
   wherein the upper and lower supports are spaced apart from each other, the driving unit is arranged within the lower support, and the detection unit is arranged within the upper support,
   wherein the iris comprises:
      a hollow rectangular parallelepiped body formed from a sheet; and
      an aperture formed through a light incident side in the hollow rectangular parallelepiped body.

2. The micro-scanner according to claim 1, wherein the driving unit comprises a coil and a magnet for driving the scan mirror.

3. The micro-scanner according to claim 1, wherein the sheet from which the hollow rectangular parallelepiped body is formed comprises a metallic sheet, and at least a face opposite to the aperture is treated with at least one of black color coating or non-reflective coating.

4. The micro-scanner according to claim 1, further comprising an iris alignment protrusion formed on at least one side of the upper support or the lower support for aligning the iris in x-y directions, wherein the alignment protrusion is sized sufficient small to prevent interference with a beam proceeding in the optical path.

5. The micro-scanner according to claim 1, wherein the iris is in contact with and fixed to both of a lower surface of the upper support and an upper surface of the lower support.

6. The micro-scanner according to claim 1, wherein the top part of the rotary shaft is inserted into a hole formed on a lower surface of the upper support, and the bottom part of the rotary shaft is inserted into a hole formed on an upper surface of the lower support.

7. The micro-scanner according to claim 1, wherein the rotary shaft is vertically arranged at an upper edge and a lower edge of the scan mirror.

8. The micro-scanner according to claim 1, wherein the scan mirror periodically rotates substantially clockwise and counter clockwise to created red sub-frames, green sub-frames and blue sub-frames that are combined into a projected color frame.

9. An image projection apparatus comprising a light source for emitting light for use in projecting an image, an optical modulator for modulating the light incident from the light source according to an image signal, and a scanner for scanning the light incident from the light modulator on a screen, wherein the scanner comprises:
- a rotary shaft having top and bottom parts;
- a scan minor for scanning incident light to a screen while swinging about the rotary shaft;
- upper and lower supports for rotatably supporting the top and bottom parts of the rotary shaft, the upper and lower supports being fixed without movement;
- a driving unit for supplying driving force for rotating the scan minor;
- a detection unit for determining a position of the scan mirror; and
- an iris interposed between the upper and lower supports and arranged adjacent the scan mirror on an optical path of the scan mirror for limiting a spot size of light incident into the scan mirror and having a slit therein so as to limit the spot size of light incident into the scan mirror from the optical modulator,
- wherein the upper and lower supports are spaced apart from each other, the driving unit is arranged within the lower support, and the detection unit is arranged within the upper support, and
- wherein the iris is in contact with and fixed to both of a lower surface of the upper support and an upper surface of the lower support, the iris comprising:
  - a hollow rectangular parallelepiped body formed from a sheet; and
  - an aperture formed through a light incident side in the hollow rectangular parallelepiped body.

10. The image projection apparatus according to claim 9, wherein the detection unit comprises a Hall sensor and an inspection magnet.

11. The image projection apparatus according to claim 9, wherein the light source comprises a plurality of different color light sources, and further comprises a light source driving unit for driving the plurality of light sources according to a synchronization signal such that the plurality of light sources sequentially project an image onto the screen.

12. The image projection apparatus according to claim 11, wherein the plurality of light sources comprise respective red, green, and blue light sources.

13. The image projection apparatus according to claim 12, wherein the green light source is positioned at a center and the red and blue light sources are positioned around the green light source.

14. The image projection apparatus according to claim 12, wherein the red green and blue light sources create a color frame for display on the screen comprising a respective red sub-frame, green sub-frame, and blue sub-frame, wherein each color frame is formed by swing rotation of the scan mirror two times.

15. The image projection apparatus according to claim 12, which includes a port for receiving image information from a portable terminal.

16. The image projection apparatus according to claim 9, wherein the top part of the rotary shaft is inserted into a hole formed on a lower surface of the upper support, and the bottom part of the rotary shaft is inserted into a hole formed on an upper surface of the lower support.

17. The image projection apparatus according to claim 9, wherein the rotary shaft is vertically arranged at an upper edge and a lower edge of the scan mirror.

18. The image projection apparatus according to claim 9, wherein the scan mirror periodically rotates substantially clockwise and counter clockwise to created red sub-frames, green sub-frames and blue sub-frames that are combined into a projected color frame.

* * * * *